July 8, 1930. W. T. HENSLEY 1,769,950
METHOD OF AND MACHINE FOR MAKING ANNULAR LAMINATED BODIES
Filed Feb. 21, 1925    3 Sheets-Sheet 1
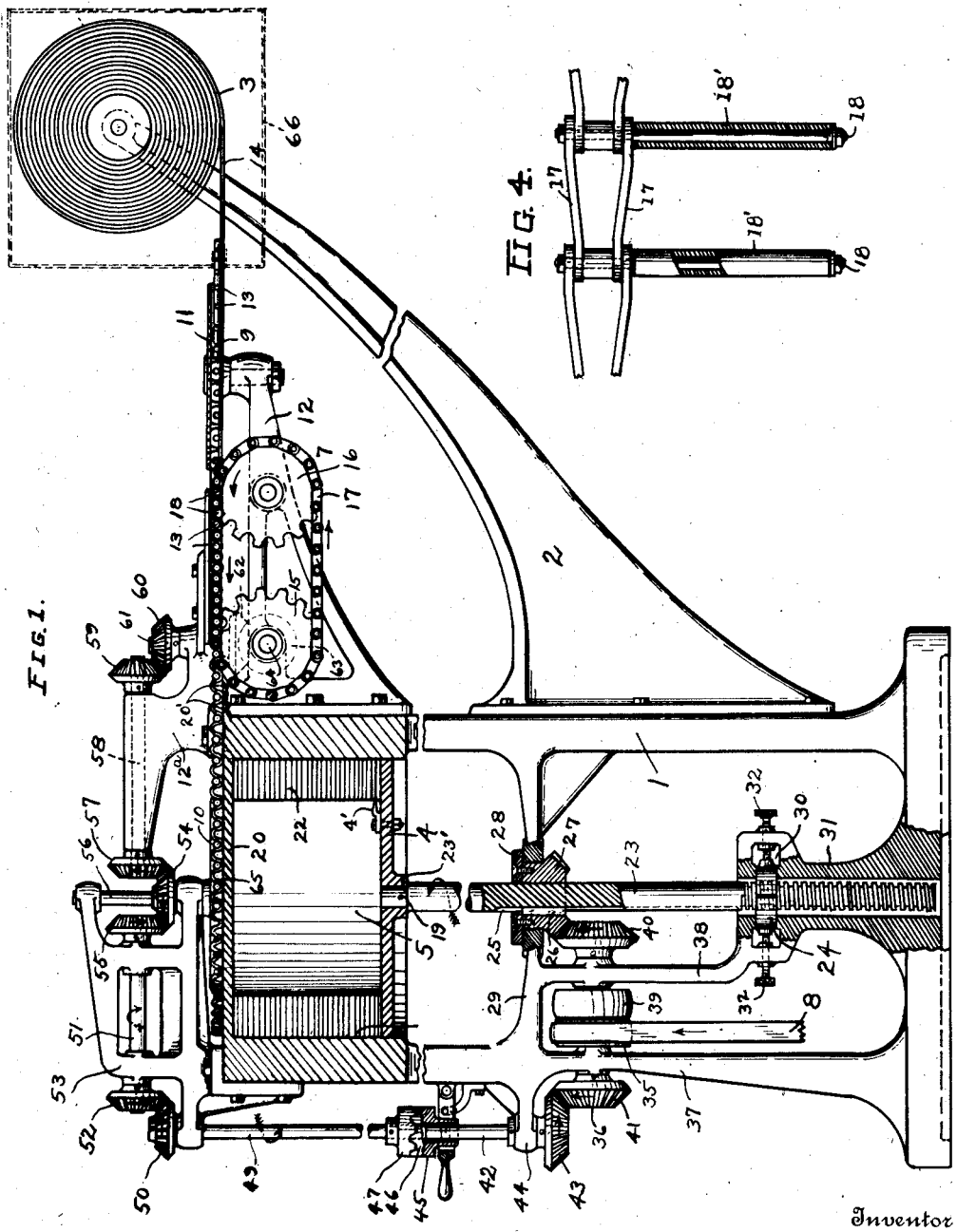
Inventor
William T. Hensley
Lloyd L. Evans
By
Attorney July 8, 1930. W. T. HENSLEY 1,769,950
METHOD OF AND MACHINE FOR MAKING ANNULAR LAMINATED BODIES
Filed Feb. 21, 1925  3 Sheets-Sheet 2
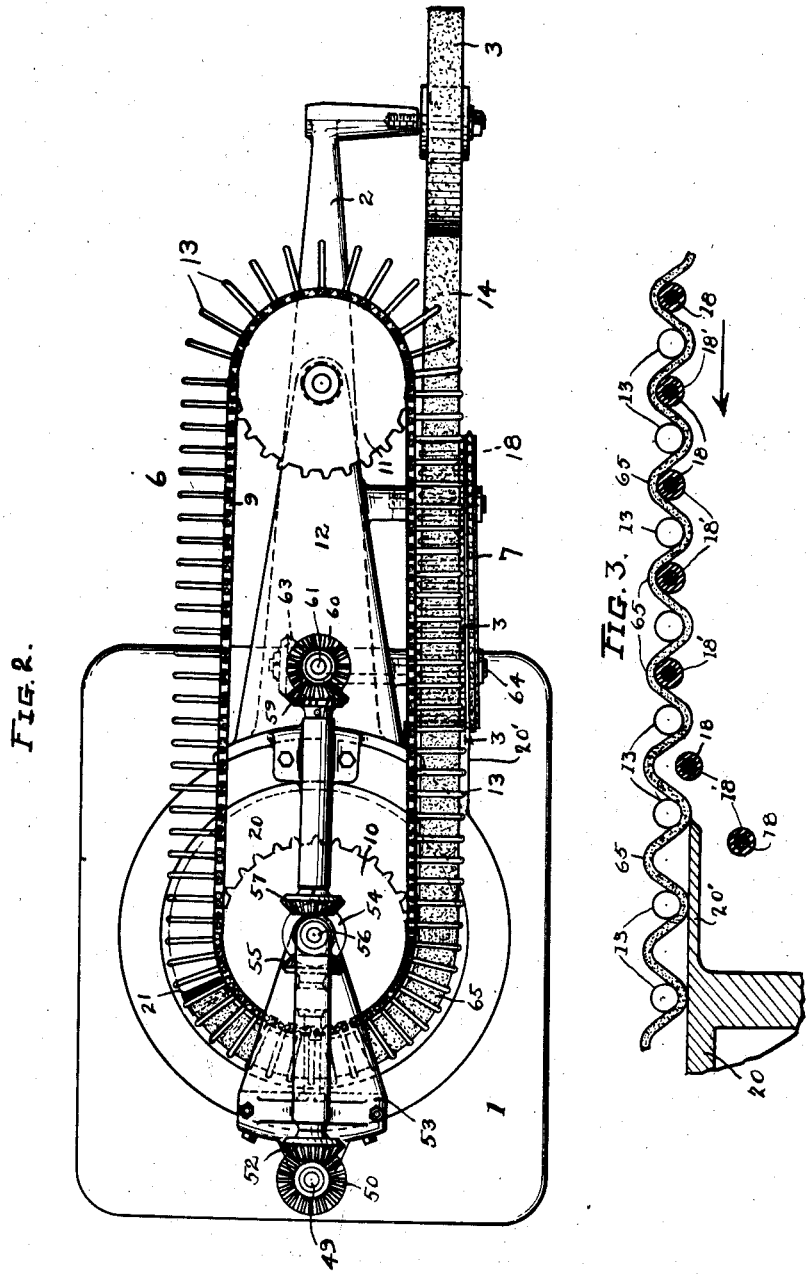
Inventor
William T. Hensley
By Lloyd L. Evans
Attorney July 8, 1930. W. T. HENSLEY 1,769,950
METHOD OF AND MACHINE FOR MAKING ANNULAR LAMINATED BODIES
Filed Feb. 21, 1925 3 Sheets-Sheet 3

Inventor
William T. Hensley

By Lloyd L. Evans
Attorney

Patented July 8, 1930

1,769,950

UNITED STATES PATENT OFFICE

WILLIAM T. HENSLEY, OF INDIANAPOLIS, INDIANA

METHOD OF AND MACHINE FOR MAKING ANNULAR LAMINATED BODIES

Application filed February 21, 1925. Serial No. 10,798.

This invention relates to a method of and a machine for making annular laminated bodies from strips of fibrous material of relatively brittle or frangible nature wound edgewise for use in connection with the manufacture of pulleys, rolls and similar articles.

Material such as strawboard, coarse woodpulp paper, and many other relatively inexpensive materials of this general nature, have such wearing qualities and operating characteristics that they can very satisfactorily be used for forming pulley faces and the like. Heretofore the brittle character of such materials and the difficulty of satisfactorily handling them prevented extensive use thereof for the purposes contemplated by this invention.

One of the objects of this invention is to provide inexpensive annular bodies of suitable material for use as pulley faces, hollow cylinders, rolls and the like.

A further object of my invention is to so form such annular bodies that the grain of the material from which the body is formed bears a definite relation to the surface of the article.

Another object of my invention is to provide a method of forming annular bodies by winding strips of relatively inexpensive, brittle or frangible material in edgewise relation into an annular body for use for the purpose specified.

A further object of my invention is to provide a method of forming hollow cylindrical units of relatively inexpensive, highly compressed material, such units to be capable of assembly to form a pulley or roll face of any desired length.

An additional object of my invention is to provide a machine that will operate in accordance with the above method of winding to satisfactorily handle material of relatively fragile and brittle character, and that will wind such material edgewise spirally, a plurality of such spirals being later compressed into annular form, the successive turns of which are arranged in contacting or nesting relation.

These and other objects will be apparent from the following description and annexed drawings, in which Fig. 1 is a side elevational view, shown partially in section with parts broken away, of a machine for winding the laminæ of annular bodies in accordance with my invention.

Fig. 2 is a top plan view of the machine shown in Fig. 1.

Fig. 3 is an edge elevational view of a portion of the strip of material, taken as it leaves the corrugating portion of the machine shown in Fig. 1. This view is taken substantially on line 3—3 of Fig. 2.

Fig. 4 is an enlarged view of the chain fingers of one part of the corrugating mechanism.

Figure 5:
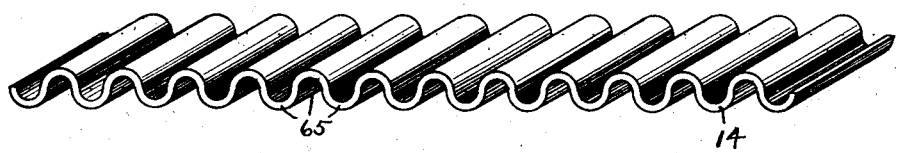
Fig. 5 shows a portion of a strip of the corrugated material before it is wound edgewise.
Figure 6:
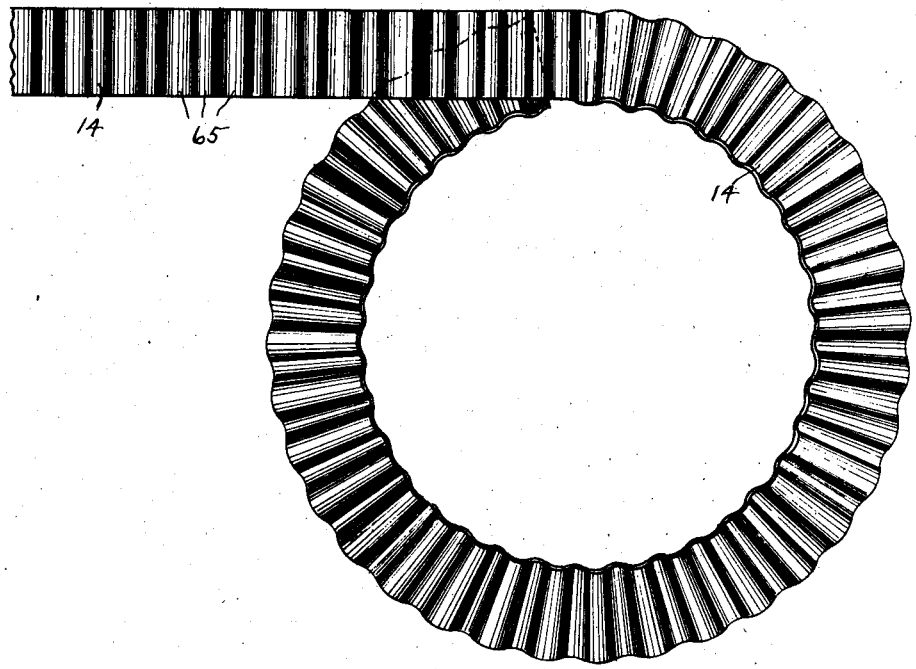
Fig. 6 shows a portion of a strip of material, with machine parts removed, as it is being wound into an annular body. The strip is shown in slightly conical shape to better indicate the wave-like edge portions.
Figure 7:
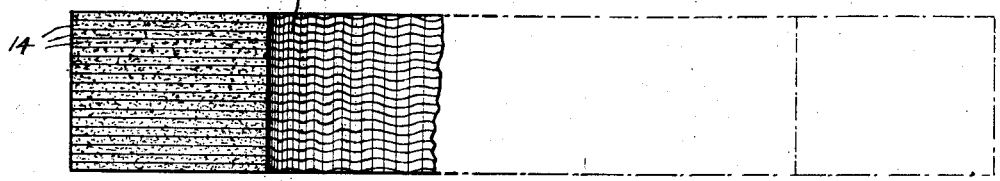
Fig. 7 is a lateral sectional view, with parts broken away, of a finished annular body constructed in accordance with my invention.

This invention may best be explained by first describing the machine for winding the spirals of the annular bodies and then explaining the operation of the machine in conjunction with the formation of them.

The machine illustrated in Figs. 1 and 2 of the drawings comprises a standard 1 having an arm 2 which supports a roll 3 of fibrous strip material, such as strawboard, coarse wood-pulp paper, or the like. This strip material is wound edgewise by the machine into annular form on a receiving head 4 which operates within a winding compartment 5 formed in the upper portion of the standard 1. The material from the supply roll 3 is suitably corrugated and conveyed into the winding compartment 5 by means of a combined winding and feeding mechanism 6 which co-operates with a suitable corrugating mechanism 7 to condition the strip of material and to carry the material to proper position in the winding compartment. The corrugating and feeding mechanism is operated at a predetermined rate relative to the receiving head 4 and is driven from a power belt 8 through suitable gear transmission mechanism which will hereinafter be explained in detail.

The roll 3 may be of any suitable material, such as strawboard or paper of relatively coarse texture and inexpensive quality, or other inexpensive material of relatively frangible and wear-resisting nature. The roll of material may be mounted in any conventional manner in order that the material may be satisfactorily delivered from the roll to the co-operating corrugating mechanism 7 and to the winding compartment by means of the combined winding and feeding mechanism 6.

The mechanism 6 comprises a sprocket chain 9 which extends around a driving sprocket 10 and an idler sprocket 11 which is journaled on a supporting arm 12 carried by the standard 1. The chain 9 has a plurality of laterally extending fingers 13 carried by the links of the chain and adapted to extend across and to engage the strip 14 of material as it is removed from the roll 3.

The co-operating mechanism 7 comprises a driving sprocket 15 and an idler sprocket 16 around which extends a chain 17. The links of the chain 17 carry transverse fingers 18, which underlie the strips 14 of material and respectively interfit and co-operate with corresponding fingers 13 which overlie the strips 14 to thereby form successive corrugations in the strip 14 at each finger position as the machine is operated. Both the driving sprocket 15 and the idler sprocket 16 are journaled on the supporting arm 12.

Preferably the fingers 18 carry rotatable sleeves or rollers 18' to reduce the friction on the strip 14 as it is being corrugated.

The winding compartment 5, formed in the upper part of the standard 1, is preferably of cylindrical form, having a cover portion 20 in which a slot 21 is formed for receiving the strip 14 of material after it has been corrugated and shaped to annular form by the fingers 13.

Carried by the cover 20 is a plate or apron 20' to underlie the strip 14 as it leaves the corrugating mechanism so that the strip will not buckle or get out of contact with the fingers 13.

The receiving head 4 is arranged to be rotated in accordance with the rate at which the partially formed annulus 22 is being built up by the machine. In order to secure the first layer on the receiving head 4 a suitable clamp or clip 4' may be provided and this insures the first strip being in the proper position for receiving the corrugated succeeding layers in nested relation. The head 4 is removably secured to the upper end of a vertical screw shaft 23 by means of a removable pin 19. The lower end of the shaft 23 is threaded to engage a suitable split elevating nut 24.

The pitch of the screw thread formed on the lower end of the shaft 23 depends upon the space necessary for the receiving head to be receded axially for each revolution for properly receiving the successive turns of material being fed into the winding compartment. The operation of the receiving head is synchronized with the operation of the feeding and corrugating mechanism. The vertical shaft 23 has a longitudinally extending slot 25 formed therein, which serves as a keyway for engaging a suitable key 26 which is held within a beveled driving gear 27 which is slidably mounted on the shaft 23. The driving gear 27 has a thrust plate 28 mounted thereon, by means of which the driving gear is rotatably supported in a spider 29 formed in the standard 1.

The split elevating nut 24 is held in position in a suitable pocket 30 which is formed in a vertical sleeve 31 of the standard 1. A pair of opposed screws 32 serve to maintain the separate halves of the elevating nut 24 in operative position on the shaft 23.

In order to prevent twisting or displacement of the turns of material fed into the winding chamber, the uppermost turn of the partially formed annulus is maintained in substantially close relationship with the upper portion of the winding compartment in order that it will act as a guide for the strip of material being fed therein and maintain the successive layers in contacting and nesting relation.

The various parts of this machine are driven from the power belt 8 through a driving pulley 35 that is mounted on a jack shaft 36. The jack shaft 36 is journaled in the arms 37 and 38 of the standard 1. An idler pulley 39 may be mounted on shaft 36, to which the driving belt 8 may be shifted when the machine is to be stopped. One end of the jack shaft 36 has a beveled gear 40 mounted thereon that engages a beveled driving gear 27 by means of which the receiving head 4 is operated. The other end of the jack shaft 36 has a beveled gear 41 that is adapted to drive a vertical spur shaft 42 through a beveled gear 43. The vertical shaft 42 is journaled in a lug 44 which is formed on the standard 1.

A manually operated clutch device 45 which is suitably mounted on the standard 1, and embodies clutch members 46 and 47 of conventional design that may be separated by the manipulation of a suitable handle to disengage the spur shaft 49 from the spur shaft 42.

Power is transmitted through the clutch device 45 to beveled gears 50 and 52 through which a horizontal spur shaft 51 is driven. The spur shafts 49 and 51 are suitably journaled in a bracket 53 that is mounted on a support 1. The shaft 51 transmits power from the beveled gear 52 to a beveled gear 54 through beveled gear 55. The beveled gear 54 drives the conveyor sprocket 10 through a vertical shaft 56 that is also journaled in the bracket 53.

Power is also transmitted from the beveled gear 54 to the driving sprocket 15 of the corrugating mechanism through a beveled gear 57, that is mounted on the end of a horizontal spur shaft 58, intermeshing beveled gears 59 and 60, and vertical spur shaft 61, intermeshing gears 62 and 63 and a horizontal driving shaft 64, which operates the driving sprocket 15. The horizontal shaft 58, the driving shaft for the corrugating sprocket 64 and the vertical spur shaft 61 are journaled in bracket 12ᵃ that is suitably mounted on the standard 1 in any desired conventional manner. The idler sprockets for both the conveyor chain and the corrugating mechanism are also journaled in the bracket 12ᵃ.

The operation of this machine may best be explained by following the strip 14 of material from its position on the roll 3 through the corrugating mechanism and under the feeding mechanism to its position in the winding chamber 5. The receiving head and the corrugating and feeding mechanisms are synchronously operated from the driving belt 8 when the clutch members 46 and 47 are engaged. The strip of material 14 passes from the roll 3 under the fingers 13 of the feeding mechanism 6 and over the interfitting fingers 18 of the co-operating corrugating mechanism 7.

As the flat strip of material 14 is unwound from the roll 3, it is engaged by the fingers 13 and the fingers 18 of the co-operating corrugating mechanism 7. The fingers 18 of the corrugating mechanism interfit and co-operate with alternate fingers 13 of the feeding mechanism in such manner that when the strip of material 14 passes between them the fingers 18 of the corrugating mechanism engage the under side of the strip 14 of material and press it in between adjacent fingers 13 of the feeding mechanism, as best shown in Fig. 3 of the drawing. This interfitting relation of the fingers 13 and 18 produces uniform folds or corrugations 65 in the strip 14, preferably of such depth that they receive the fingers 13 of the feeding mechanism which engage the strip of frangible material 14 in many places along its length to uniformly propel the corrugated strip over the upper face of the cover 20 of the winding chamber which acts as a guide apron for maintaining the corrugated strip of material in operating relation with the feeding fingers 13.

As the feeding mechanism 6 advances, it carries with it the strip 14 around the driving sprocket portion 10 where the fingers assume a radial formation by reason of the movement of the links of the chain 9 around the sprocket 10. This change in the relative position of the fingers causes the strip 14 to be extended along its outer edge, resulting in the bending of the strip to arcuate form prior to its introduction into the winding chamber 5 through the aperture 21 that is formed in the head of the chamber. The co-operation of the upper face of the cover 20 of the winding chamber with the feeding fingers 13, prevents any twisting of the corrugated strip as it is fed into the winding chamber and overcomes any tendency of the strip to twist because of the edgewise curvature that it is forced to assume.

As the curved portion of the strip 14 is fed into the winding chamber, it is superposed on the partially formed annulus that is advanced by the receiving head 4 in accordance with the rate of feed of the curved portion of the strip to the winding chamber through the operation of the feed fingers 13.

The partially formed annulus is maintained in sufficiently close relationship to the cover 20 of the winding chamber to insure that the turns of the strip are superposed flatwise upon the previously wound portion of the annulus and to prevent any tendency of the strip to twist as it is being assembled into annular form.

The receiving head 4 is advanced in accordance with the rate of feed of the arcuate formed strip to the winding chamber in order to insure that the relatively frangible material will be received into the winding chamber with minimum frictional resistance.

After the annulus 22 is built up to the desired degree, the strip 14 of material is severed and the remainder thereof is fed into the winding chamber. The annulus may then either be removed from the winding chamber or compressed within the chamber as is done in the machine herein disclosed. In order to prevent the rotation of the receiving head 4 during the compressing operation, the pin 19 is removed from the reduced upper end of the shaft 23. The shoulder 23' of the shaft 23 engages the lower part of the receiving head 4 so that the latter may be pushed upwardly to compress the annulus. The clutch members 46 and 47 are then disengaged by movement of the clutch handle, and the belt 8 is reversed in direction. By reversing the direction of operation of the jack shaft 36, the shaft 23 is operated by the driving belt 8 in such direction as to elevate the head 4 of the machine which now serves as a compressing platen. The reverse operation of the elevating screw 23 causes the annular body 22 to be compressed to any desired degree by reason of its confinement in the winding chamber 5 between the cover portion 20 of the chamber and the winding head 4.

A suitable binder may either be applied to the strip of material as it leaves the roll 3 or at any other stage in the operation in order that the binder may fix the compressed body of material in its compressed condition.

The annular body may be removed from the winding chamber, after being consolidated into a composite mass, after again operating the screw 23 in a forward direction so that the head 4 is lowered to such position that the annular body may be removed from the winding chamber.

If it is desired that the material of the annulus 22 be consolidated to greater density than can be obtained by operation of the screw 23 as a compressing screw, then the annular body may be further consolidated by hydraulic pressure, with or without the application of heat.

In the event that a phenol condensation product is used as a binder, it may be desirable to solidify the annulus 22 under heat and pressure within any conventional form of external mold (not shown).

The flat-faced annulus which is formed has many desirable characteristics. Strawboard or other material from which such an annulus is formed has excellent wear-resisting qualities as well as having surface characteristics that are particularly desirable when annular bodies of this nature are used as the power transmitting face of pulleys and the like. The method of forming a body of this character causes the density of the body to be much greater adjacent the inner surface of the annulus than adjacent the outer face thereof. The density of the material gradually increases from the outer portion to the inner portion of the annulus.

Strawboard and other non-metallic material of like character generally has a well defined grain that has certain frictional characteristics that are very desirable when bodies formed from such material are used in power transmitting mechanism. If the grain of the strawboard extends transversely across the strip of material, then a pulley constructed in accordance with the above method of operation has the grain of the strawboard extending radially of the face of the pulley, thus presenting the grain of the material endwise to the contacting drive belt or drive surface in connection with which the pulley is used. It will also be understood that any other desired uniform arrangement of the grain of the material may be obtained by cutting the strips of material from the sheet in such manner relative to the sheet material from which they are formed that the grain of the assembled annulus from which a drive pulley is subsequently manufactured, extends in such other definite, angular relation with respect to the face of the pulley as may be desired.

It will thus be seen that with my construction I am able to produce an annular body in which the grain of the material is arranged in any predetermined angular relation with respect to the tractive surface of the body. This is due to the fact that whether the grain runs longitudinally of the strip 14 or transversely thereof or at some other angle, the grain of the material of the strip, when wound into an annulus, will have a definite relation to the face of the annular body.

It will also be seen that the annular body will have a minimum density at its face and a maximum density at its center, and this may be varied to suit different conditions by changing the amount of compression to which the annular body is subjected after it is built up in the winding chamber.

In case the strawboard or material to be corrugated and formed into annular bodies is of such character that it needs to be softened, this may be readily done by enclosing the roll in a steam chest 66, as indicated by the dotted lines in Fig. 1, or by applying a steam jet to the strip where desired.

Although I have described a single type of machine for constructing annular bodies of the type under consideration, I desire that my invention should not be restricted to this particular machine but that it shall include obvious modifications thereof embodying substantially the same characteristics. I desire, therefore, that only such limitations shall be imposed upon my invention as are set forth in the spirit and scope of the appending claims.

What I claim is:

1. The method of forming a laminated annular body from a strip of relatively frangible fibrous material which consists in forming a plurality of transverse folds in the strip, curving the folded portion of the strip edgewise to arcuate form of substantially the radius of curvature assumed by the strip when consolidated into the finished annular body, causing the apices of said folds to be separated along one edge of the strip, while positively holding the apices of said folds along the other edge of said strip in predetermined spaced relationship, superposing successive turns of the curved strip directly upon one another to thereby form an annular body, maintaining the plane of the strip material substantially at right angles to the axis of the body being formed, and greatly compressing the body so formed after the application thereto of a suitable binder to form a composite annular body of varying degrees of density radially.

2. The method of forming an annular laminated body from a flat strip of fibrous, relatively frangible material having the grain thereof extending substantially transversely of the strip that consists in corrugating the strip, spreading the outer edge of the strip while positively holding the apices of the corrugations along the other edge of said strip in predetermined spaced relationship, to thus bend the strip edgewise into arcuate form of the radius of curvature of the body being formed, continuously feeding the bent portion of the strip while maintaining it in bent condition in substantially the plane of the annulus upon turns thereof previously applied in the formation of the annulus, feeding and winding the strip continuously until a body of the desired size is obtained, and compressing the body to greatly reduce its axial dimension after the application of a suitable binder to the material thereof.

3. The method of forming an annular laminated body from a flat strip of fibrous material of relatively frangible nature having the grain thereof extending in a predetermined direction relative to the strip that consists in forming transverse corrugations in the strip, changing the corrugations to decrease their depth along one edge of the strip while maintaining the strip substantially in the same general plane and while positively holding the apices of said corrugations along the other edge of said strip in predetermined spaced relationship, continuously feeding the edgewise-bent portion of the strip into an annulus, rotating the annulus at a rate determined by the rate at which the strip of material is supplied to the annulus, compressing the body thus formed to materially condense the material thereof after the application thereto of a binder adapted to fix the body in such compressed condition.

4. The method of forming an annular body from sheet material having a defined grain that consists in cutting the material into strips extending in a predetermined direction relative to the grain thereof, spreading one edge of the material and simultaneously supporting the strip to prevent twisting thereof, feeding the strip and continuously winding it to form an annulus compressing the body of material thus formed after the application of a binder thereto to thereby consolidate the material into a composite mass of varying physical density throughout and having the grain of the material therein extending in a definite angular relation relative to the surface of the body thus formed.

5. A device comprising, means for corrugating strips of flat material, means adapted to bend the material edgewise into arcuate form, a winding chamber into which the material of arcuate form is introduced, and a receiving head disposed within said chamber and adapted to move the portion of the strip being wound in accordance with the rate of supply of said strip to the winding chamber.

6. A device comprising, strip corrugating means, means adapted to bend a corrugated strip edgewise into arcuate form, a receiving head, means for feeding the arcuate strip onto the receiving head, and means for rotating the receiving head in accordance with the rate of feed of the strip.

7. Apparatus for forming laminated bodies comprising, means for continuously corrugating a strip of frangible, fibrous material transversely, means for causing said strip to assume an arcuate form, and means for winding said arcuate strip spirally on itself in face to face relation to form an annular body.

8. Apparatus for forming laminated bodies comprising, means for continuously corrugating a strip of fibrous material transversely, means for causing said strip to assume an arcuate form, means for winding said arcuately formed strip spirally on itself to form an annular body, and means adapted to compress said body.

9. Apparatus for forming laminated bodies comprising synchronized means for continuously corrugating a strip transversely, means for causing said strip to assume an arcuate form, means for winding said arcuate strip spirally on itself to form an annular body, means for rotating said annular body in accordance with the rate of winding said strip.

10. Apparatus for forming annular laminated bodies comprising means for continuously corrugating the strip transversely, means registering with the corrugations adapted to engage said strip at a plurality of spaced intervals, means for causing said strip to assume an arcuate form, and means for feeding said arcuately formed strip spirally on itself to build up an annular body, said corrugating means and said winding means being synchronized in their operation.

11. In a strip winding machine, the combination of a corrugating mechanism, a guide surface, a feed chain associated therewith having fingers adapted to engage a strip of material at intervals along its length and to propel the strip of material along the guide surface to edgewise arcuate form and to deliver said strip from said conveyor to a winding chamber, and a receiving head in said chamber adapted to be rotated in accordance with the rate of feed of the strip through the chamber.

12. The method of forming an annular body from a strip of relatively frangible fibrous material which consists in corrugating said strip, positively holding the apices of the corrugations along one edge of said strip in predetermined spaced relationship, bending the strip edgewise to the desired radius of curvature of the annulus to be formed while maintaining the strip substantially in the same plane, continuously winding said strip in superposed turns in contacting relation to form an annulus, and compressing said annulus to form a composite annular body.

13. The method of forming an annular body from a strip of relatively frangible fibrous material which consists in forming bends transversely of a strip of such material, bending the strip edgewise while maintaining the strip substantially in the same plane and while positively holding the apices of the bends along one edge of said strip in predetermined spaced relationship, continuously winding said strip in contacting face to face relation to form an annulus, and compressing said material to form a composite annular laminated body.

14. Apparatus for forming an annular laminated body from a strip of relatively frangible fibrous material which comprises, in combination, a guide surface, sprocket wheels, an endless feed chain composed of a series of pivoted links and having fingers extending outwardly therefrom and adapted to engage the strip of material at intervals along its length and to propel this strip of material along the guide surface around a portion of one of said sprocket wheels to thereby bend the strip edgewise to annular form.

15. In a strip winding machine, the combination of a corrugating mechanism for transversely corrugating a strip of fibrous material, an endless feed chain comprising a series of pivoted links, fingers carried by certain of said links and adapted to engage the transverse corrugations of the strip, a pair of sprocket wheels for driving said chain, said fingers extending outwardly from the chain and being adapted to engage the transverse corrugations of the strip whereby said fingers will assume a radial position when the chain is passing around one of the sprocket wheels and thereby spread the outer portions of the corrugations of the strip, thus causing the strip to assume an arcuate form.

16. The method of forming an annular body from a flat strip of fibrous material, which consists in corrugating said strip, positively holding the apices of the corrugations of said strip along one edge in predetermined spaced relationship and in the same plane while bending said strip edgewise to the desired radius of curvature of the annulus being formed, and while separating the apices of the corrugations of the strip along the other edge of the strip whereby the strip assumes an arcuate form, continuously winding said strip in superposed turns in contacting relation to form an annular body and compressing said annular body.

17. The method of forming an annular body from a strip of relatively frangible fibrous material having the grain disposed substantially transversely of the strip, which consists in corrugating said strip, positively holding the apices of the corrugations along one edge of said strip in predetermined spaced relationship while bending the strip edgewise to the desired radius of curvature of the annulus to be formed, and continuously winding said strip in superposed turns in contacting relation to form an annulus with the grain disposed substantially radially of the annulus, and compressing the annulus to form a composite annular body.

18. The method of forming an annular body from a flat strip of relatively frangible fibrous material having the grain disposed in a predetermined annular direction, which consists in corrugating the strip, positively holding the apices along one edge of said strip in predetermined spaced relationship while positively spreading the apices of the corrugations along the other edge of the strip and while bending the strip edgewise to the desired radius of curvature of the annulus to be formed, continuously winding said strip in superposed turns in contacting relation to form an annulus, and compressing said annulus to form a composite annular body.

In testimony whereof, I hereunto affix my signature.

WILLIAM T. HENSLEY.